(12) United States Patent
Bingle

(10) Patent No.: US 9,892,583 B2
(45) Date of Patent: Feb. 13, 2018

(54) DOOR HANDLE WITH INTEGRATED KEYPAD

(71) Applicant: ADAC PLASTICS, INC., Grand Rapids, MI (US)

(72) Inventor: Robert L. Bingle, Grand Rapids, MI (US)

(73) Assignee: ADAC Plastics, Inc., Grand Rapids, MI (US)

(*) Notice: Subject to any disclaimer, the term of this patent is extended or adjusted under 35 U.S.C. 154(b) by 0 days.

(21) Appl. No.: 15/191,642

(22) Filed: Jun. 24, 2016

(65) Prior Publication Data

US 2016/0376819 A1     Dec. 29, 2016

Related U.S. Application Data

(60) Provisional application No. 62/185,279, filed on Jun. 26, 2015.

(51) Int. Cl.
| | |
|---|---|
| *G07C 9/00* | (2006.01) |
| *E05B 81/76* | (2014.01) |
| *E05B 85/16* | (2014.01) |
| *E05B 15/16* | (2006.01) |
| *E05B 1/00* | (2006.01) |
| *B60R 25/23* | (2013.01) |

(52) U.S. Cl.
CPC ........ *G07C 9/00658* (2013.01); *E05B 1/0084* (2013.01); *E05B 15/1635* (2013.01); *E05B 81/76* (2013.01); *E05B 85/16* (2013.01); *B60R 25/23* (2013.01); *G07C 9/0069* (2013.01); *G07C 9/00174* (2013.01); *G07C 9/00944* (2013.01); *G07C 2209/65* (2013.01)

(58) Field of Classification Search
USPC .......................................... 362/501; 340/5.54
See application file for complete search history.

(56) References Cited

U.S. PATENT DOCUMENTS

| | | | |
|---|---|---|---|
| 7,576,631 B1 | 8/2009 | Bingle et al. | |
| 7,911,321 B2 | 3/2011 | Bingle et al. | |
| 2008/0018437 A1 | 1/2008 | Reichling et al. | |
| 2010/0219935 A1* | 9/2010 | Bingle | E05B 81/76 340/5.54 |
| 2014/0338409 A1 | 11/2014 | Kraus et al. | |

* cited by examiner

*Primary Examiner* — Daniel Hess
(74) *Attorney, Agent, or Firm* — Barnes & Thornburg LLP

(57) ABSTRACT

A door handle assembly for a motor vehicle includes a grip disposed between opposing mounting members. The mounting members are secured in an abutting relationship to a door panel of a vehicle door. The grip is spaced from the door panel by the opposing mounting members. A plurality of digitals comprising a keypad is disposed along the grip between the opposing mounting members. The grip includes a first appearance characteristic and the plurality of digitals includes a second appearance characteristic. The first appearance characteristic is substantially indistinguishable from the second appearance characteristic.

20 Claims, 3 Drawing Sheets

DOOR HANDLE WITH INTEGRATED KEYPAD

PRIOR APPLICATIONS

The present application claims priority to U.S. Provisional Patent Application No. 62/185,279 filed Jun. 26, 2015, the contents of which are incorporated herein by reference.

TECHNICAL FIELD

The present invention relates generally toward a handle for a door of a motor vehicle. More specifically, the present invention relates toward the handle for motor vehicle having an integrated keypad.

BACKGROUND

The use of keypads on motor vehicles for gaining entry to the interior of the vehicle has been available for several years and has proven to be a popular option. The keypad is typically located on an exterior surface of the automotive vehicle such as, for example, a B pillar disposed between front and rear doors or on exterior sheet metal of the vehicle door. Locating a keypad in this manner is difficult to integrate on a moving assembly line. In addition, automotive vehicle stylists prefer not to incorporate a keypad on sheet metal or B pillars of vehicles because the keypad disrupts the aesthetics of the vehicle desired by stylists.

An attempt to remove the keypad from the B-pillar and exterior sheet metal resulted in an attempt to locate the keypad on the handle as is disclosed in U.S. Patent Application Publication No. 2014/0338409. However, these efforts have proven ineffective resulting in bulky, poorly designed handles where the keypad is featured more prominently than even those located on B-pillars and exterior sheet metal.

It would be desirable to remove the keypad from a B-pillar or sheet metal to resolve the problem set forth above while overcoming the poor appearance of those efforts to locate a keypad in a handle. In addition, many vehicles such as, for example, convertibles do not even include a B pillar. Therefore, it would be desirable to provide an alternative keypad arrangement for providing keyless entry into a vehicle.

SUMMARY

A door handle assembly for a motor vehicle is disclosed. The door handle includes a grip disposed between opposing mounting members. The mounting members are secured in an abutting relationship to a door panel of the vehicle so that the grip is spaced from the door panel by the opposing mounting members. A plurality of digitals defining a keypad is disposed along the grip extending between the opposing mounting members. The grip includes a first appearance characteristic and the plurality of digitals includes a second appearance characteristic. The first appearance characteristic is substantially indistinguishable from the second appearance characteristic so that the digitals are not readily visible relative to the grip.

The door handle of the present invention has met the functional characteristic of including a keypad for keyless entry into a motor vehicle while making the keypad substantially indistinguishable from the door handle. In addition, the keypad used for keyless entry is now contained within a modular device requiring no additional assembly operations be performed upon a moving assembly line in a vehicle assembly plant. Therefore, each of the problems of the prior art concepts of including the keypad on an exterior of a motor vehicle is achieved by the door handle assembly of the present invention.

BRIEF DESCRIPTION OF THE DRAWINGS

Other advantages of the present invention will be readily appreciated as the same becomes better understood by reference to the following detailed description when considered in connection with the accompanying drawings, wherein.

DETAILED DESCRIPTION

Figure 1:
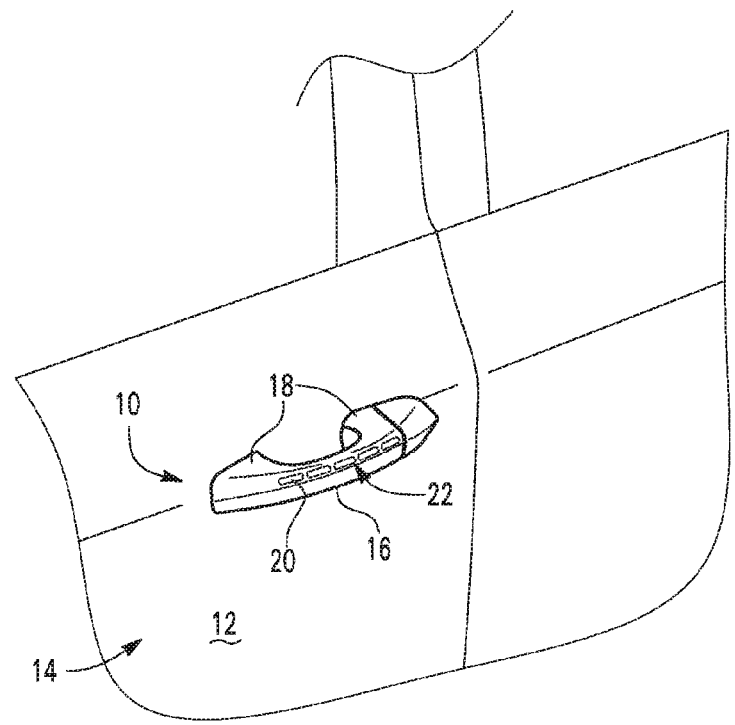
FIG. 1 shows a grip of the present invention in an environmental view on an exterior of a motor vehicle.

Referring to FIG. 1, the door handle assembly of the present invention is generally shown at 10. The handle assembly 10 is affixed to a door panel 12 of a vehicle door 14 in a known manner. The handle assembly 10 includes a grip 16 disposed between opposing mounting members 18. The mounting members 18 are secured in an abutting relationship to the door panel 12 of the vehicle door 14. The mounting members 18 space the grip 16 from the door panel 12 enabling a passenger to easily clasp the grip 16 for opening and closing the vehicle door 14.

Figure 2:
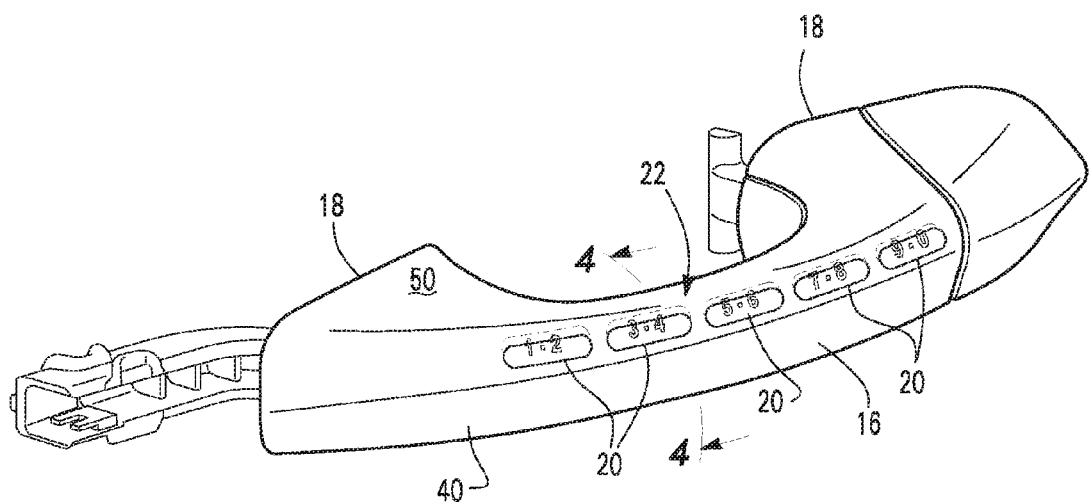
FIG. 2 shows a perspective view of the grip assembly of the present invention.

As best represented in FIG. 2, a plurality of digitals 20 is disposed along the grip 16 of the handle assembly 10 extending between the opposing mounting members 18. The digitals 20 form a keypad generally shown at 22 the purpose of which will become more evident herein below. The digitals 20 function in a number of different manners including, but not limited to, push button, or touch sensors, pressure sensors, heat sensors, light sensors, piezoelectric sensors, or any other sensor that would transmit indication of an attempt to actuate a particular digital 20.

The grip 16 and opposing mounting members 18 include a first appearance characteristic that matches that of a painted door panel 12. Each of the digitals 20 include a second appearance characteristic that is substantially indistinguishable from the first appearance characteristic of the grip 16 and opposing mounting members 18. In this manner, the digitals 20 are indistinguishable, or substantially indistinguishable from the grip 16. Therefore, even though the keypad 22 is disposed upon the grip 16 of the handle assembly 10, the vehicle is provided with an aesthetically continuous appearance between the door panel 12, the handle assembly 10, including the digitals 20. For further clarity, substantially indistinguishable as used herein includes not distinguishable and nearly indistinguishable without discerning examination.

Each of the plurality of digitals 20 includes an icon 24 making each digital 20 distinguishable from other of the digitals 20. In this embodiment, the icon 24 located at each digital 20 includes two sequential numbers providing a variant of codes capable of unlocking the vehicle door 14 to provide access to a passenger compartment (not shown). However, alternative icons 24 may also be used including letters, emoji's, and the like.

Figure 3:
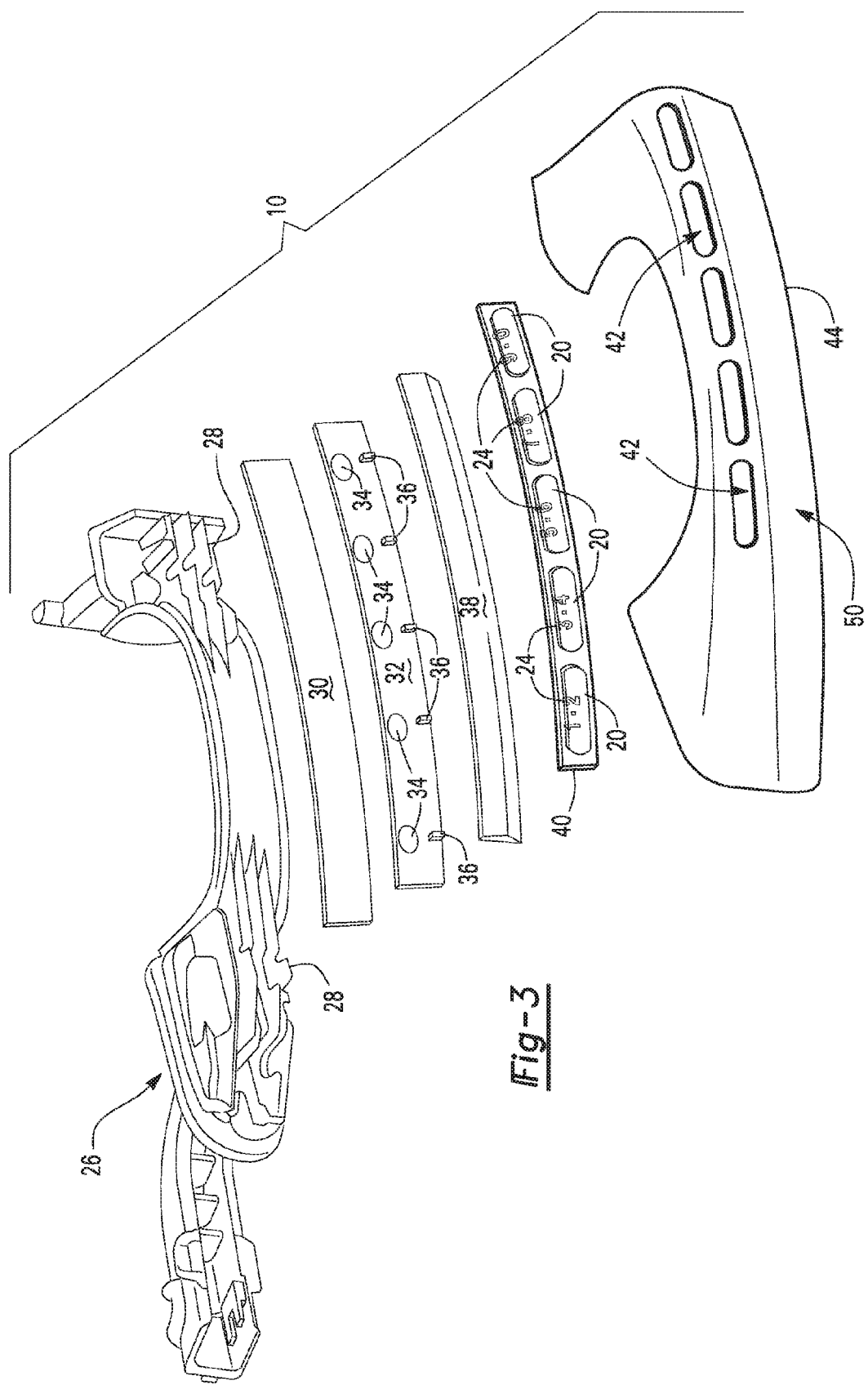
FIG. 3 shows an exploded view of the grip of the present invention.

Referring now to FIG. 3, where an exploded view of the handle assembly 10 is shown, various aspects of the individual components will now be explained. The assembly 10 includes an inner handle 26 that provides structural support to the assembly 10 and interfaces with the door panel 12 to secure the assembly 10 to the vehicle door 14. In addition, the support feature 28 receives additional elements of the assembly 10 in a manner that secures these elements in a manner necessary to withstand jounce and rebound typical of motor vehicle. An inner control panel or a circuit board 30 is received by the support feature 28. The inner control panel 30 includes solid state technology programmed to provide an interface between the handle assembly 10 and other vehicle electronics (not shown), as necessary.

A sensor circuit board 32 includes a plurality of sensors 34, each of which is aligned with one of the digitals 20. Each sensor 34 receives input from depression or contacting a corresponding digital 20 and transmits intent to actuate an individual digital 20 to the inner control panel 30, which in turn signals a vehicle controller of such intent. As set forth above, any type of sensor 34 capable of receiving intent to actuate a corresponding digital 20 will suffice to achieve the desirable effects of the present invention.

The sensor circuit board 32 also includes a plurality of illumination devices 86, in this embodiment taking the form of a light emitting diode (LED), as will be referenced herein without limiting intent. In this embodiment, an LED 36 is located proximate each digital 20 to illuminate that digital 20. Alternatively, a single, or opposing LED 36 may be located at one or both ends of the sensor circuit board 32 to provide an alternative illumination effect and to reduce cost of the assembly 10. For simplicity, the electrical interaction between the inner control panel 30, engine electronics, and the sensor circuit board 32 are not shown.

Some or all of the LED's 36 may be illuminated based upon different inputs. For example, proximity of an occupant as detected by way of a key FOB signal transmitted to a receiver disposed upon the inner control panel 30 causing one or all of the illumination devices 36 to backlight one or all of the digitals 20. When subject to backlighting by the illumination devices 36, the digitals 20 are no longer substantially indistinguishable from the grip 16 but are readily visible.

An inner lens 38 is located between the sensor circuit board 32 and an outer lens 40. The inner lens 38 refracts light generated by the illumination device 36 to achieve a more desirable illumination of the digitals 20 subject to backlighting by the illumination device 36. Different lighting schemes are also within the scope of the invention, including, but not limited to, alternative or alternating colors, brightness, shading, etc. Many of these different lighting schemes can be achieved by alternative polygonal design of the inner lens 38. For example, a single LED 36 can transmit an equivalent amount of light to each of the digitals 20 based upon an alternate polygonal design of the inner lens 38.

The digitals 20 are formed into the outer lens 38 and are received by cooperative apertures 42 defined by an outer handle 44. Therefore, each digital 20 is aligned with a corresponding aperture 42 defined by the outer handle 44.

Figure 4:
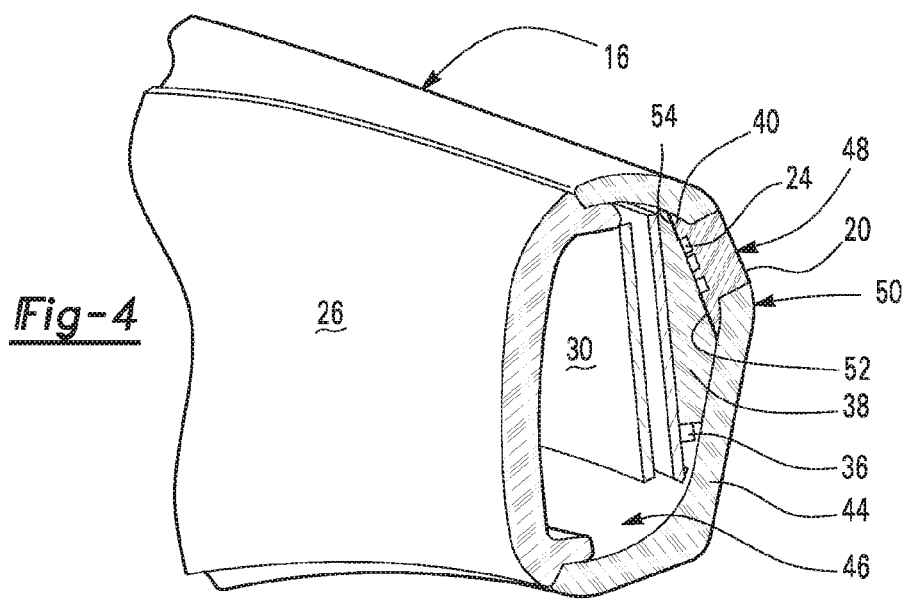
FIG. 4 shows a sectional view through line 44 of FIG. 2.

As best represented in FIG. 4, the inner handle 26 is secured to the outer handle 44 to define a cavity 46. The cross-sectional view of FIG. 4 shows a digital 20 received by the aperture 42 so that the digital surface 48 is flush or nearly flush with a handle surface 50 of the outer handle 44. However, it should be understood that the digital surface 48 can extend beyond the handle surface 50, or be disposed just below the handle surface 50 providing a distinguishing feature between the digital 20 when not illuminated and the grip 16 of the handle assembly 10.

The outer lens 40 is formed from a clear or translucent polymeric material to facilitate illumination via the LED 36 and the inner lens 38. It is desirable that the outer lens 40 provide a gloss level substantially the same as the gloss level of a paint and/or clear coat applied to the handle surface 50 of the outer handle 44. The gloss level of the paint applied to the handle surface 50 matches or substantially matches the gloss level of the clear coat applied to the door panel 12. In this manner, the door panel 12, the handle surface 50, and the digitals 20 blend together in an aesthetically pleasing manner.

Figure 5:
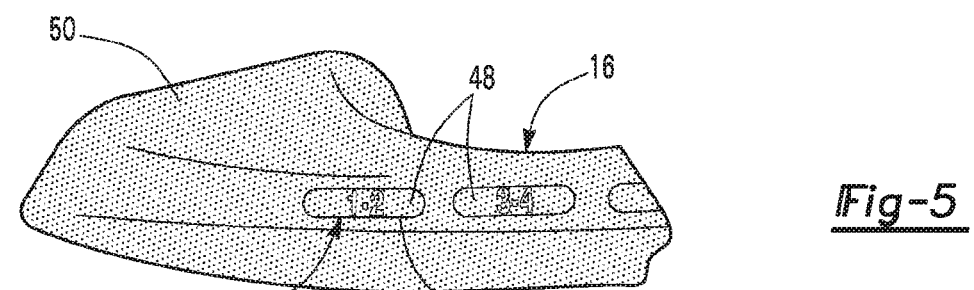
FIG. 5 shows a partial perspective view of the digitals being substantially indistinguishable from the grip.

The outer lens 40 presents a back surface 52 that receives a coating 54 that when viewed through the outer lens 40 provides the appearance that the digitals 20 are the same color as the coating applied to the handle surface 50. Therefore, the digitals 20 become substantially indistinguishable when not backlit by the LED 36, now having the same color and gloss level as does the handle surface 50. This is best represented in FIG. 5 where the digitals 20 of the keypad 22 are shown having the substantially similar appearance as does the handle surface 50.

The icons 24 are molded into the back surface 52 of the outer lens 40 as is best represented in FIG. 4. The icons 24 are optionally coated with a different color than that of the coating 54 applied to the back surface 52 of the outer lens 40 so that the icons 24 are always perceivable regardless of the appearance of the digitals 20. Alternatively, the icons 24 receive the same coating 54 as does the back surface 52 of the outer lens 40 and the icons 24 only become perceivable when illuminated by the LED 36.

Figure 6:
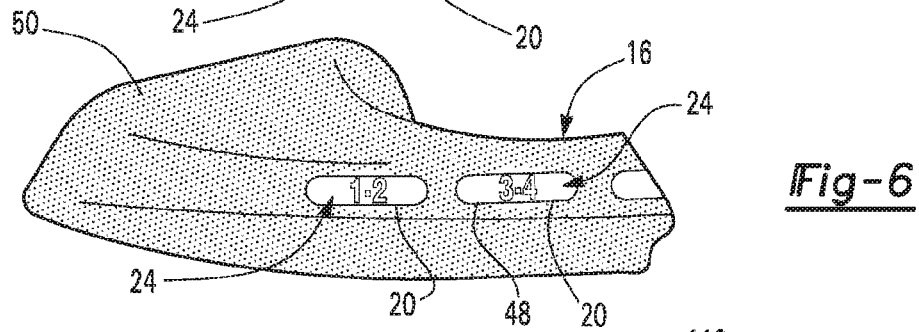
FIG. 6 shows a partial perspective view showing the digitals being illuminated.

Referring again to FIG. 4, the inner lens 38 is positioned in an abutting relationship with the outer lens 40 positioning the LED's 36 in a location best adapted to provide desired illuminating effect to the digitals 20 through the inner lens 38. The inner lens 38 includes a polygonal configuration also adapted to refract light received from the LED 36 through the digitals 20 in a desired manner. As shown in FIG. 6, the digitals 20 have now been illuminated distinguishing the digitals 20 from the handle surface 50 of the outer handle 44.

Figure 7:
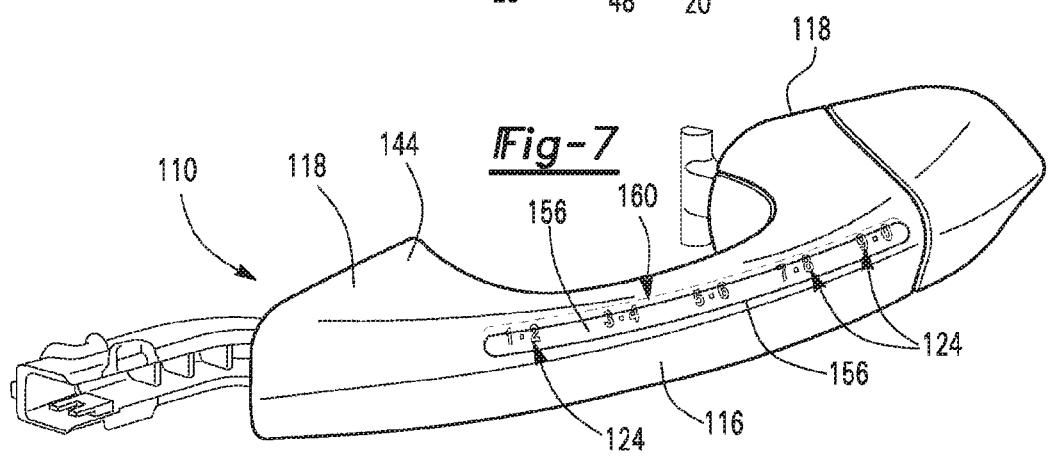
FIG. 7 shows an alternative embodiment of the keypad.

Referring to FIG. 7, an alternative embodiment is generally shown at 110 wherein like reference numerals of the first embodiment are identified in the 100 series. In this embodiment, the outer handle 144 defines a continuous slot 156 extending along the grip 116 between the opposing mounting members 118. A continuous digital 158 is received in the continuous slot 156 to define the alternative keypad 160. Icons 124 similar to those identified in the prior embodiment are spaced along the continuous digital 158 under which sensors (not shown) are disposed to detect and desire to actuate a given digital 158 to enter a passcode. However, it should be understood that the sensor 30 is similar to those sensors 30 shown in FIG. 3 of the prior embodiment. As set forth above, the sensors 30 take the form of any sensor capable of detecting such intent.

The invention has been described in an illustrative manner, and it is to be understood that the terminology has been used as intended to be in the nature of words of description rather than of limitation. Obviously, many modifications and variations of the present invention are possible in light of the above teachings. For example, it is contemplated that the digitals 20, 158 are coated on the digital surface 48 as opposed to the back surface 52 to make the digitals 20, 158 even less distinguishable from the grip 16. It is, therefore, to be understood that within the specification, the reference numerals are merely for convenience, and are not to be in any way limiting, as the invention may be practiced otherwise than what is specifically described.

What is claimed is:

1. A door handle assembly for a motor vehicle, comprising:
    a grip disposed between opposing mounting members with the mounting members configured to be secured in an abutting relationship to a door panel of a vehicle door, the grip defining at least one aperture therethrough between the said opposing mounting members;
    a first coating applied to an outer surface of the grip;
    a first lens formed of a clear or translucent material defining at least one digital having a digital surface extending away from the first lens and defining a back surface opposite the digital surface, the at least one digital received in the at least one aperture defined through the grip; and
    a second coating applied to the back surface of the first lens, the second coating selected such that, when viewed through the digital surface of the at least one digital, the at least one digital appears to be the same color as that of the first coating applied to the outer surface of the grip.

2. The assembly of claim 1, wherein the at least one digital comprises a plurality of digitals,
    and wherein the at least one aperture comprises a plurality of apertures each receiving a corresponding one of the plurality of digitals therein.

3. The assembly of claim 1, wherein the at least one digital comprises a single continuous digital and the at least one aperture comprises a single aperture receiving the single continuous digital therein.

4. The assembly of claim 1, wherein the first coating applied the outer surface of the grip has a first gloss level,
    and wherein the clear or translucent material forming the first lens has a second gloss level substantially identical to the first gloss level.

5. The assembly of claim 1, further comprising at least one icon formed at the back surface of the first lens and aligned with the at least one digital.

6. The assembly of claim 5, wherein the second coating is applied to the at least one icon.

7. The assembly of claim 5, wherein a third coating, different from the second coating, is applied to the at least one icon such that the at least one icon is visually distinguishable from the at least one digital.

8. The assembly of claim 5, wherein the at least one digital comprises a plurality of digitals,
    and wherein the at least one icon comprises a plurality of icons each aligned with a different one of the plurality of digitals,
    and wherein each of the plurality of icons is different from others of the plurality of icons to distinguish each of the plurality of digitals from one another.

9. The assembly of claim 5, wherein the at least one digital comprises a plurality of digitals, and wherein the at least one icon comprises a plurality of icons each aligned with a different one of the plurality of digitals, and wherein the assembly further comprises:
    a second lens abutting back surface of the first lens; and
    a plurality of illumination devices each positioned to selectively illuminate a different one of the plurality of digitals through the second lens.

10. The assembly of claim 1, further comprising:
    a second lens abutting back surface of the first lens; and
    at least one illumination device positioned to selectively illuminate the at least one digital through the second lens.

11. The assembly of claim 10, further comprising at least one icon formed at the back surface of the first lens and aligned with the at least one digital,
    wherein the at least one icon is distinguishable from the at least one digital only when the at least one digital is illuminated through the second lens by the at least one illumination device and is otherwise indistinguishable from the at least one digital.

12. The assembly of claim 10, wherein the at least one illumination device comprises at least one light emitting diode.

13. The assembly of claim 1, further comprising at least one sensor positioned to detect depression of or contact with the at least one digital and produce a detection signal corresponding thereto.

14. The assembly of claim 13, wherein the at least one digital comprises a plurality of digitals,
    and wherein the at least one sensor comprises a plurality of sensors each aligned with a different one of the plurality of digitals,
    and wherein each of the plurality of sensors is responsive to depression of or contact with a corresponding one of the plurality of digitals to produce a detection signal corresponding thereto.

15. The assembly of claim 14, further comprising a plurality of icons formed at the back surface of the first lens each aligned with a different one of the plurality of digitals,
    wherein each of the plurality of icons is different from others of the plurality of icons to provide for entering a code via depression of or contact with a specified combination of the plurality of digitals.

16. The assembly of claim 15, further comprising:
    a second lens abutting back surface of the first lens; and
    a plurality of illumination devices each positioned to selectively illuminate a different one of the plurality of digitals through the second lens.

17. The assembly of claim 16, further comprising a circuit board positioned adjacent to the second lens,
    wherein the plurality of sensors and the plurality of illumination devices are mounted to the circuit board.

18. The assembly of claim 1, wherein the at least one digital is received in the at least one aperture with the digital surface flush with outer surface of the grip.

19. The assembly of claim 1, wherein the at least one digital is received in the at least one aperture with the digital surface extending beyond the outer surface of the grip.

20. The assembly of claim 1, wherein the at least one digital is received in the at least one aperture with the digital surface disposed below the outer surface of the grip.

* * * * *